Aug. 25, 1959
G. L. HELLER
2,900,737
METHOD OF CASE HARDENING CARBON BLACK PELLETS
Filed Dec. 24, 1956
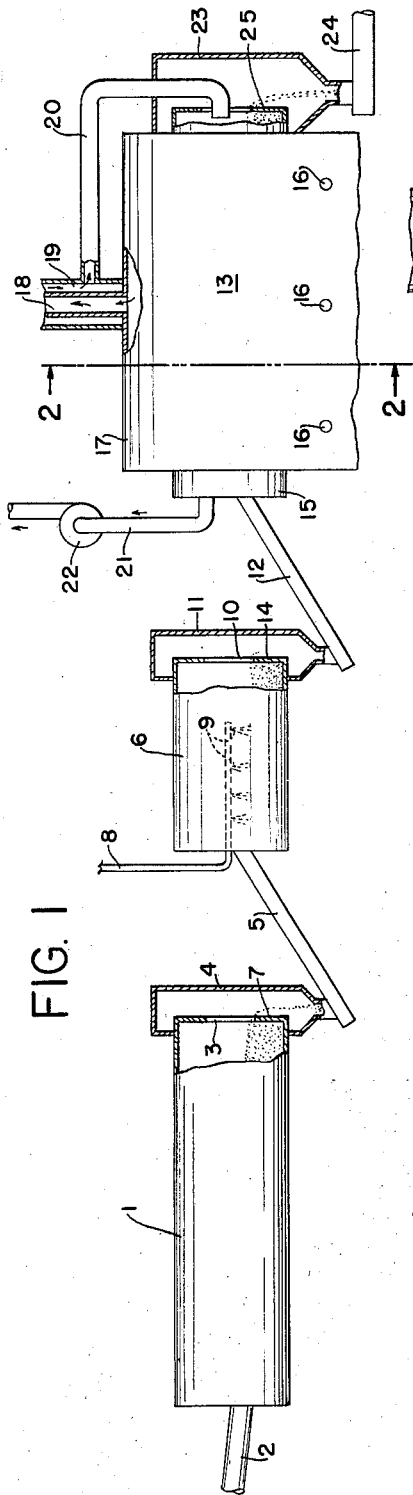
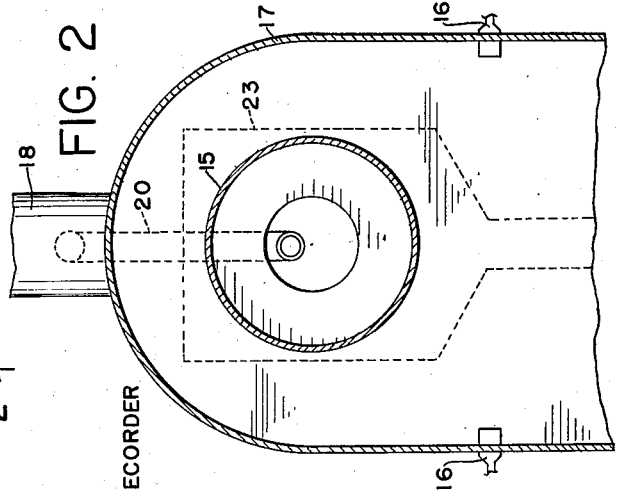
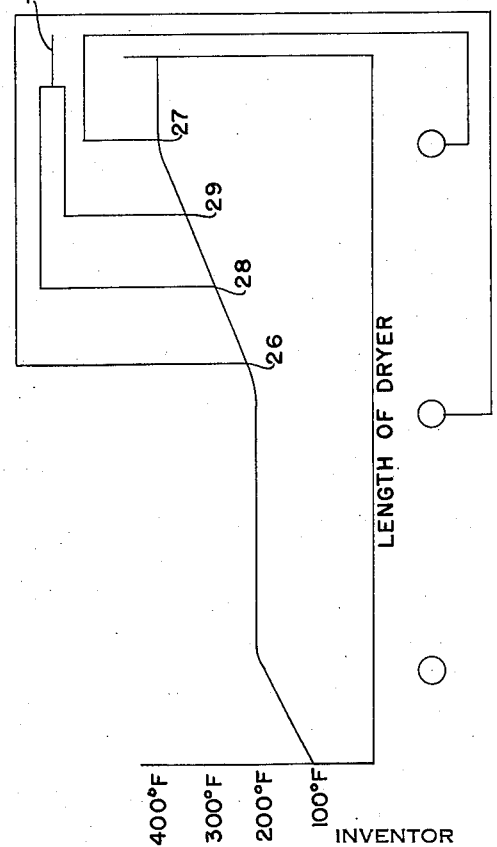
INVENTOR
GEORGE L. HELLER
BY
Pennie, Edmonds, Morton, Barrows & Taylor
ATTORNEYS

2,900,737
METHOD OF CASE HARDENING CARBON BLACK PELLETS

George L. Heller, Monroe, La., assignor to Columbian Carbon Company, New York, N.Y., a corporation of Delaware Application December 24, 1956, Serial No. 630,225

9 Claims. (Cl. 34—12)

This invention relates to the beading or pelletizing of carbon black and more particularly to an improved method whereby the resistance of the beads to crushing and packing may be materially increased.

Carbon black, as initially produced, is a very fine, fluffy powder of exceedingly low bulk density, which readily flies into the atmosphere and presents numerous difficulties in handling, shipping and storage, with which the industry is familiar.

In order to increase its density, reduce flying and minimize handling difficulties, it has been proposed to form the carbon black into relatively dustless, free-flowing, generally spheroidal pellets or beads of sufficient strength to withstand ordinary handling without crushing.

Such beads have been produced by tumbling or otherwise agitating the black, without added water, by causing the dry black to pass slowly through a rotating drum, as described, for instance, in the Glaxner Patent 2,187,601. Carbon black beads have also been produced by agitating the black with about an equal weight of water to form a pasty mass and continuing the agitation until the wet black has been formed into beads. The resultant wet beads are then dried to a moisture content not exceeding 1% and usually about 0.1% by weight.

Substantially dustless free-flowing beads have been produced by each of these two methods, i.e. the dry-beading process and the wet-beading process. However, beads thus formed from certain types of carbon black have been found deficient in crushing strength, i.e. resistance to crushing, and tend to lose their free-flowing characters when subjected to pressures of the order frequently encountered in the shipping and handling of the pelleted black. Various procedures have been proposed for increasing the crushing strength and the so-called "packing point" of the beads.

It has been proposed, for instance, in the forming of beads by the wet-beading process, to include a binder in the beading water in an effort to strengthen the beads. It has also been proposed to include in the beading water various surface active agents to assist in the wetting of the black.

It has further been proposed to increase the strength of beads made by the dry-beading process by soaking the resultant dry beads in water and permitting a major portion of the water absorbed by the beads to remain in the finished beads. It was found that if beads thus treated were thereafter dried, the increased hardness and resistance to crushing, imparted to the beads by the soaking treatment, is lost. This soaking procedure is open to the objections that carbon black beads containing substantial proportions of water are not usually acceptable to the trade. The water remaining in the beads increases their shipping weight and, even more serious, the contained water is introduced into the rubber composition, or the like, with which the carbon black is subsequently compounded and is eliminated only at added cost.

The dry-beading process has the advantage of producing more nearly spherical beads and also of avoiding the necessity of subsequently drying the beads. But dry beads produced by either of these processes, especially from certain types of carbon black and more particularly carbon blacks of the type known as structure blacks, usually tend to crush, pack and mat together under severe conditions of shipment and mechanical handling and thus lose their freely-flowing characteristics.

It is the primary object of the present invention to produce dry carbon black beads, i.e. beads dried to a water content not in excess of about $\frac{1}{10}$ of one percent, by weight, having increased crushing strength and packing point values. I have discovered that this can be accomplished, without detrimentally affecting the subsequent dispersibility of the carbon black, by slightly hardening the outer surfaces of the beads, as hereinafter described.

This surface hardening or "case-hardening" of the beads is accomplished, in accordance with my present invention, by uniformly wetting dry-process carbon black beads with water in such quantity and in such a manner as to wet only the outer portion of the beads to a depth not exceeding about one-fourth to one-third of their diameter, tumbling the beads while effecting this surface wetting, and finally drying the beads with continued tumbling.

The surface wetting of the beads is effected by spraying a carefully regulated quantity of water onto the beads as they are being tumbled, preferably at a somewhat elevated temperature, and continuing the tumbling while the beads are being dried at an elevated temperature, above 212° F. but not in excess of about 550° F. This drying of the beads with continued tumbling should immediately follow the wetting and tumbling step. Further, the water should be added in such amount and at such rate as to avoid reducing the surfaces of beads to a pasty consistency.

The optimum bead temperature during the wetting and drying steps, respectively, will vary somewhat with the beading characteristics of the particular carbon black. I have with advantage charged the dry beads to the wetting zone at a temperature of 120°–160° F. as they come from the dry-beading operation. In some instances, I have found it desirable to preheat the dry beads to 212° F. or higher before the surface wetting step. In most instances, I have found a maximum drying temperature of about 400° F. to result in superior beads.

I have carried out the wetting and drying of the beads as consecutive steps in a single tumbling drum, externally heated and provided with means for spraying water into the forward end of the drum. In such operation, the preformed dry-process beads are continuously charged into one end of the drum and the finished, dried, case-hardened beads are continuously withdrawn from the other end of the drum. The drum is provided with a dam, for instance a circular collar extending inwardly from the walls of the drum at its outlet end to retain a predetermined volume of beads in the drum. The drum is constantly rotated about its longitudinal axis at a moderate rate to effect the tumbling and rolling of the beads, and water is sprayed downwardly upon the constantly changing surface of the tumbling mass of beads in the upstream end of the drum at a rate carefully regulated with respect to the rate at which the dry-process beads are charged to the drum. I presently prefer to effect the surface wetting and the drying steps in separate drums, as hereinafter more fully described.

As previously noted, it is frequently desirable, though not necessary, to preheat the dry beads before they are charged to the tumbling drum. I have with advantage so preheated the beads to temperatures up to 500° F., particularly where the wetting and drying is effected in a single drum. In this way the beads may be sprayed with water immediately upon entering the drum and the capacity of the apparatus thus increased.

Also with certain types of black I have found it advantageous to preheat the spray water to a temperature approximating its boiling point. This tends to promote the wetting of the bead surfaces and also lessens the extent of cooling of the beads by the water spray. Various surface active agents or binders may be included in the spray water to promote wetting of the beads or further to increase their resistance to crushing, but this is not usually necessary except where severe handling of the finished beads is anticipated.

Whether or not the spray water is preheated or contains a surface active agent or binder, it is particularly desirable that the water be introduced as a relatively coarse spray, as distinguished from highly atomized streams. This is particularly important where the surface wetting and drying steps are carried out in the same drum. The spray should not be so fine as to result in excessive misting or vaporization of the water before it can come in contact with the carbon black. The water should reach the surface of the tumbling bed of beads as droplets, as distinguished from a mist or fog. Also in most instances, especially where a drum of a moderate diameter is used, it is desirable that the pattern of the spray be elliptical with its greater axis parallel to the longitudinal axis of the drum. By this means more uniform and effective surface wetting of the pellets is obtainable.

The proportion of water to be added to the dry beads is necessarily substantially lower than that required in the conventional wet-beading processes and will vary somewhat, depending primarily upon the characteristics of the black and the size of the dry pellets. Smaller beads, having a greater surface area per pound, tend to require somewhat larger proportions of water than do larger beads. Also beads composed of a more absorbent type of carbon black tend to require relatively larger proportions of water. But whatever the nature of the beads, or of the carbon black of which they are composed, no substantial improvement with respect to the crushing strength and packing point is obtained where less than 40 pounds of water is added per 100 pounds of dry-process beads. A proportion of water within the range of 40 to 70 pounds per 100 pounds of dry-process beads has been found generally satisfactory. In most instances, 50–60 pounds of water per 100 pounds of the dry beads has been found highly effective. But where the carbon black is of the very fine type, the use of up to 90% of water in the case-hardening operation has been used with advantage.

In accordance with an especially advantageous aspect of the invention, I add to the loose black passing to the dry-beading step a relatively small proportion of water, within the range of about 4% to about 16% on the dry weight of the black. This small amount of water is, of course, insufficient to wet the black but is completely absorbed thereby so that the mixture has the appearance and feel of black to which no water at all has been added. Further, the resultant beads, especially with respect to their smooth spheroidal surfaces, are typical of ordinary dry-process beads. Proportions of water even as high as 33% have been used with advantage with more difficult beaded blacks.

This amount of water present in the carbon black during the dry-beading step is, of course, nowhere near that required for wet-beading and the operation remains typically a dry-beading operation. However, this small amount of water has been found greatly to accelerate the dry-beading step and to improve the characteristics of the beads formed by that operation, particularly where processing a high-structure carbon black.

Where this small increment of water is added prior to the dry-beading step, the optimum proportion of water used in the subsequent case-hardening step, though within the herein prescribed range, will usually be somewhat less than where no water is present during the dry-beading.

Whether or not water is present in the dry-beading step, it is essentially that the beads resulting from that step be of a density of at least 20.5 pounds per cubic foot, preferably within a range of 21–22 pounds per cubic foot, in order to obtain substantial improvement in the strength of the beads by the subsequent case-hardening operation. I have found that only a negligible increase in crushing strength and packing point of the beads is effected by my case-hardening operation where the beads so treated are of a lower density, i.e. below 20.5 pounds per cubic foot. One advantage of that aspect of my invention, whereby a small increment of water is added preliminary to the dry-beading operation, is that it promotes the obtaining of this essential density of the dry-process beads.

The invention will be further described and illustrated with reference to the accompanying drawings which represent conventionally and diagrammatically apparatus which has been used with particular advantage in carrying out the process and of which:

Fig. 1 is a schematic elevational view, partly in section, of apparatus adapted to the carrying out of the process, Fig. 2 is a vertical transverse sectional view along the line 2—2 of Fig. 1, and Fig. 3 is a graph illustrating temperature gradients through the drier.

An ordinary rotatably mounted tumbling drum, such as conventionally used in the dry-beading of carbon black is represented at 1. As fully understood in this art, carbon black in powdered form, advantageously somewhat predensed, is charged continuously to the front end of the drum, through a conveyor represented at 2, while the drum is being slowly rotated about its longitudinal axis by means not necessary here to describe or illustrate. In passing through the rotating drum, the carbon black is formed into dry beads or pellets which continuously flow from the drum through the opening 3 into the dustproof hopper 4 and from thence are carried by means of a conveyor indicated at 5 into the rotatably mounted wetting drum 6. The depth of the bed of carbon black retained in drum 1 is determined by the height of the dam represented at 7, as well understood in the art.

Wetting drum 6 is constructed, supported and rotated similar to drum 1, but usually is of somewhat less length. In passing through drum 6, the dry beads are continuously tumbled by rotation of the drum about its longitudinal axis and water, supplied through line 8, is continuously sprayed through uniformly spaced sprays 9 onto the constantly changing surface of the bed of beads in carefully regulated portions, as previously described. These partially wetted beads overflow from drum 6 through outlet 10 into hopper 11, pass from the lower end thereof, and are carried by conveyor 12 into the bead drier 13. The depth of the bed of beads retained in drum 6 is controlled by the height of the dam 14. A depth of about 6 to 8 inches has been found satisfactory.

This drier 13 is of the general type known to the industry as a Direct-Indirect Drier. It consists essentially of an elongated cylindrical drum 15 rotatably supported by known means and externally heated by means of gas burners 16 positioned below, and along each side of, the drum, all enclosed within the hood 17.

Hot combustion gases from the burners 16 pass upwardly around the drum and from the upper end of the hood through heat-exchanger stack 18. The stack 18 is surrounded by an annular passageway 19 through which air passes downwardly in heat-exchange with the hot stack gases and flows from the lower end of the annular chamber through conduit 20 into the downstream end of drum 15. Effluent air conduit 21 leads from the upstream end of the drum to an exhaust blower 22 which discharges the hot moisture laden air into the atmosphere.

With the drum in continuous rotation, surface wetted carbon black beads are continuously charged into the upstream end of the drum by means of screw conveyor 12 and gradually move through the drum, as a bed of substantial depth in continuous rolling and tumbling motion, to the outlet end of the drum from which the beads flow, through the shielding hood 23, into the screw conveyor 24 by which they are discharged from the system.

The depth of the bed of beads passing through the drier is controlled, of course, by the height of the exit dam 25. A bed depth of about 6 to 10 inches is generally satisfactory. As the beads course through the drier, they are progressively heated and dried, and as they pass from drum 15 contain less than 1% of moisture usually about 0.1%.

I have found that the rate at which the beads are heated and dried, and the maximum bead temperature attained in the drier, materially influence the strength of the resultant beads. The temperature gradient and maximum temperature are readily controlled by adjustment of the respective burners 16 uniformly spaced along the length of the drum. I usually employ three sets of burners spaced along each side of the drum. Burners of the type known to the trade as "John Zink" burners have been found most satisfactory for this purpose.

For optimum results, I have found that the bead temperature should not exceed about 220° F. until they have passed the midpoint in the length of the drum, and that thereafter the bead temperature should be rapidly increased to about 400° F. and held at that temperature for a brief interval before passing from the drum.

These optimum conditions are graphically illustrated by Fig. 3 of the drawings. In this graph, the length of the drum 15, e.g. 24 feet, is plotted along the ordinate, and the temperature of the beads at the various points along their path through the drum is plotted along the abscissa.

It will be observed from this graph that the beads entering the drum at about 100° F. are rapidly heated to a temperature of about 220° F. by about the time they reach the position of the first set of burners, that temperature being maintained until the beads have reached the position of the second set of burners, i.e. the midpoint in the length of the drier drum. The bead temperature is then rapidly increased until they attain a temperature of about 400° F. at a point about 3 feet from the drier drum exit.

This temperature gradient may be readily maintained by a system of thermocouples appropriately positioned along the path of the black through the drier drum, the burner operation being automatically controlled by known means responsive to the thermocouple action.

I prefer to control the first set of burners manually. The second set of burners is controlled by a thermocouple positioned in the bed of beads at a point along its path indicated at 26. This thermocouple acts as a temperature anticipator, adjusting the burner at a position somewhat upstream from the thermocouple position. The last set of burners is controlled automatically by a thermocouple positioned at position 27, so as to maintain the predetermined maximum temperature. Thermocouples positioned at the points indicated at 28 and 29 are connected to a recorder, not shown, to serve as a check on operating conditions.

It will be understood that the foregoing detailed description of the apparatus is for illustrative purposes and that the invention is not restricted thereto. The method and means employed in forming the dry-process beads are not critical so long as the herein prescribed density of the dry-process beads is obtained. Similarly, the invention in its broader aspect is not restricted as to the method or means of carrying out the final drying step. Any of the methods conventionally used in the drying of wet-process beads may be employed.

The wetting drum is likewise subject to various structural and dimensional variations. I have, for example, used a wetting drum, substantially as represented in the drawing, 4 feet in length and 20 inches in diameter, provided with a 6-inch dam at its outlet, and adapted to be rotated at about 25 r.p.m. This drum was provided with 3 water sprays placed on 8-inch centers, the first spray being positioned 4 inches from the inlet to the drum.

I have also used, with advantage, a wetting drum 3 feet in diameter and 6 feet long with an 8-inch dam at its outlet end, and provided with 4 water sprays on 12-inch centers, the first spray being positioned 6 inches from the inlet to the drum. In other instances, I have used a wetting drum 4 feet in diameter and 14 feet long.

The invention is applicable to the treatment of dry-process beads regardless of the type of carbon black of which they are composed but is especially useful in the beading of furnace blacks.

Optimum operating conditions for obtaining the results desired will vary somewhat with the characteristics of the carbon black being processed. As previously noted, the optimum proportion of water will vary within the specified range depending primarily upon the type of black. Likewise, the duration of the dry-beading step to obtain the required density will vary with the characteristics of the black and will depend primarily on the length, diameter and speed of rotation of the dry-beading drum and the rate of throughput. Other variables will include the length, diameter and rate of rotation of the wetting drum and the bead depth maintained in that drum and also the rate at which the dry-process beads are charged to the wetting drum.

The invention will be further illustrated by the following specific examples of its operation:

*Example I*

In the processing of an HAF type of black, dry-process beads produced in the conventional manner are continuously charged at a uniform rate of 40,000 pounds per day to the previously described wet-beading drum 3 feet in diameter and 6 feet long rotated at about 25 r.p.m. Water at a uniform rate of 50–60 pounds per 100 pounds of dry-process beads is injected through the sprays and the resultant partially wetted beads are dried by passing them through a drier of the direct-indirect type, illustrated in the drawing, and heated to a maximum temperature of about 400° F., as previously described. The resultant dried beads have been found to have a crushing strength of about 3.2 grams and a packing point of about 25 pounds, as determined by the method hereinafter described. Except where the minor proportion of water is used in the dry-beading step, the density of the final dried beads is substantially that of the beads charged to the wetting drum.

*Example II*

In the beading of ISAF black, I have charged dry-process beads at rates varying from 40,000–60,000 pounds per day to a wetting drum, of the type described, 4 feet in diameter, 14 feet long and rotating at about 25 r.p.m., the amount of water used in partially wetting the beads passing through the wetting drum being within the range of 50–90 pounds of water per 100 pounds of black. By this procedure, I have obtained beads, after drying as previously described, having a crushing strength of 6.2 grams and a packing point of 35 pounds, with no substantial increase in density.

In the beading of HAF type of black in apparatus such as used in the foregoing Example II, the dry-process beads charged to the wetting drum in accordance with my present invention have had an average packing point of 15 pounds and an average crushing strength of 2.1 grams. By the process of my present invention, I have increased the average packing point of the final dry beads to 27.5 pounds and the average crushing strength to 3.2 grams.

Similarly, in the beading of HAF type black in the apparatus of Example I, the average packing point of the dry-process beads charged to the wetting drum was 22.5 pounds and their average crushing strength 2.4 grams. By my case-hardening process, I have raised the average packing point to 32.5 pounds and the average crushing strength to 3.8 grams.

The herein referred to crushing strength of the beads is determined by carefully selecting from a mass of beads to be tested a single bead screened selectively to 0.6 mm. in diameter and placing the selected bead on a glass slide resting on one pan of an analytical balance. A second glass slide is rigidly supported in a fixed position just above the upper surface of the bead. After careful adjustment for tare, the other pan of the balance is gradually weighted until the bead between the glass slides is seen to crush or crack open. The crushing strength is then reported in grams.

The characteristic herein referred to as "packing point" is determined by placing a metal disk in the lower end of a 2-inch pipe 4¼ inches long held in a vertical position. The pipe is then almost filled with the carbon black beads to be tested and a similar disk is carefully placed on the surface of the pellets in the upper end of the tube. A constant weight is then applied to the upper disk for a period of 2-4 seconds. Thereafter, the weight is removed. If the beads flow freely from the pipe upon removal of the lower disk, the operation is repeated using an increased weight. If, at the increased weight, the beads bridge over and do not flow freely through the pipe upon removal of the weight and of the lower disk, the test is repeated with a somewhat decreased weight. The weight in pounds being applied to the upper disk when the beads just begin to bridge over within the pipe is recorded as the "packing point."

Besides improvement in crushing strength and packing point, my improved process has the advantage of preserving the size and surface smoothness of the initially produced dry-process beads and with little or no change in density. Of course, where moisture is present in the dry-beading step, a proportionate change in density will result from the driving-off of that moisture in my final drying step.

As an alternative procedure in carrying out my process, I have, as previously noted, charged the dry-process beads directly to a direct-indirect drier, such as shown in the drawing, but provided with means for spraying water onto the surface of the tumbling bed of beads in the upstream portion of the drum, the wetting and drying steps being carried out in the single piece of apparatus.

In such operations, using a drying drum 24 feet long and 6 feet in diameter rotating at about 15 r.p.m., I have charged the dry-process beads through the drum at a rate of 3,000 pounds to 5,000 pounds per day. The dam at the drum exit has been varied from 6 inches to 16 inches in height, depending upon the type of black being treated.

In treating blacks of the SRF type, I have with advantage used a dam height of about 6 inches, while in treating blacks of the SAF type, a dam height of about 16 inches has been used effectively. A dam height of about 12 inches has been found preferable in treating furnace blacks of the HAF and of the FEF types.

In these operations, I have advantageously maintained the beads in the forward end of the drum, prior to contact with water, at a temperature of about 300° F. and the exit bead temperature at about 350° F. The temperature of the bed of beads in the mid-section of the drum, just following the water sprays, has been generally found to range from 190–200° F. The temperature of the preheated air charged into the outlet end of the drum is with advantage maintained at about 250–300° F.

By this procedure, I have increased the crushing strength of dry-process beads composed of HAF type of black from 1.9 grams to 2.4 grams. With other types of black, I have increased the crushing strength of the beads from 2 grams to 2.9 grams, at the same time increasing their packing point from 6.8 pounds to 28.3 pounds.

In each instance, the dry-process beads used in the specific examples described herein were made by passing the loose black through an ordinary tumbling drum, such as illustrated in the drawings, to form beads of a bulk density in excess of 20.5 pounds per cubic foot.

It will be understood that the abbreviated designations of types of carbon black appearing herein have the following meanings, in accordance with accepted nomenclature of this art:

HAF indicates High Abrasion Furnace black.
ISAF indicates Intermediate Super Abrasion Furnace black.
SRF indicates Semi-Reinforcing Furnace black.
SAF indicates Super Abrasion Furnace black.
FEF indicates Fast-Extruding Furnace black.

I claim:

1. Method of producing substantially dry beads of carbon black having exceptionally high resistance to crushing and packing which comprises uniformly wetting the outer portions only of preformed dry-process beads having a bulk density of at least 20.5 pounds per cubic foot, with water in proportions within the range of 40 pounds to 90 pounds per 100 pounds of the dry-process beads and thereafter drying the beads to a moisture content not exceeding about 1% by weight.

2. Method of producing substantially dry beads of carbon black having exceptionally high resistance to crushing and packing which comprises uniformly wetting the outer portions only of preformed dry-process beads having a bulk density of at least 20.5 pounds per cubic foot, with water in proportions within the range of 40 pounds to 90 pounds per 100 pounds of the dry-process beads and thereafter passing the wetted beads directly to and through a tumbling drum and therein tumbling and drying the beads to a moisture content not exceeding about 1% by weight as they pass therethrough while heating them to a maximum temperature of about 400° F.

3. The process of claim 1 in which the dry-process beads so treated are of a bulk density within the range of 21–22 pounds per cubic foot.

4. The process of claim 1 in which the dry-process beads are wetted by spraying the water onto the surfaces of a constantly tumbling bed of the beads.

5. The process of claim 4 in which the dry-process beads are sprayed with the water while the beads are at an elevated temperature within the range of 212° to 500° F.

6. The process of claim 1 in which the dry-process beads so treated are prepared by tumbling loose carbon black to which there has been added from 4–33 pounds of water per 100 pounds of the carbon black.

7. The process of claim 1 in which the wetted beads are dried by passing them through an externally heated tumbling drum, tumbling the beads as they pass therethrough and rapidly heating them to a temperature of about 220° F. and maintaining them at that temperature until the major portion of the water has been evaporated, thereafter raising the temperature of the tumbling mass of beads as they continue through the drum to a final temperature of about 400° F. before discharging them from the drum and passing air preheated to a temperature within the range of 250° to 300° F. over, and in contact with, the tumbling bed of beads passing through the drying drum.

8. The process of claim 1 in which the proportion of water used is 50–60 pounds per 100 pounds of dry-process beads.

9. The process of claim 4 in which the water used is preheated to a temperature approximating its boiling point.

References Cited in the file of this patent

UNITED STATES PATENTS 2,538,482     Studebaker _____ Jan. 16, 1952